Nov. 19, 1957 W. H. HAGEDORN 2,813,428
ROTARY LAWN MOWER BLADE BALANCER
Filed Feb. 6, 1956 2 Sheets-Sheet 1
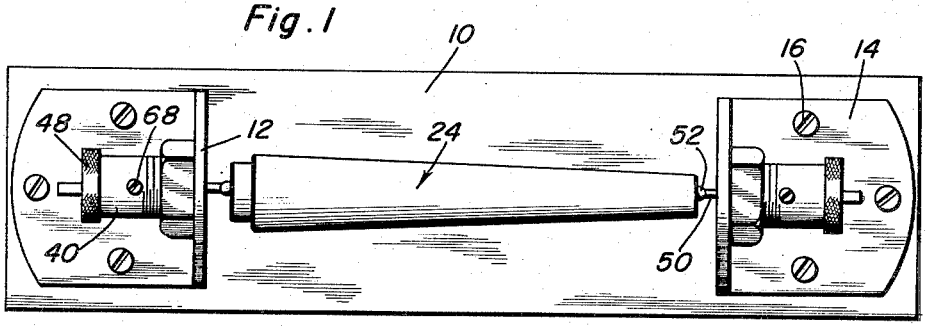
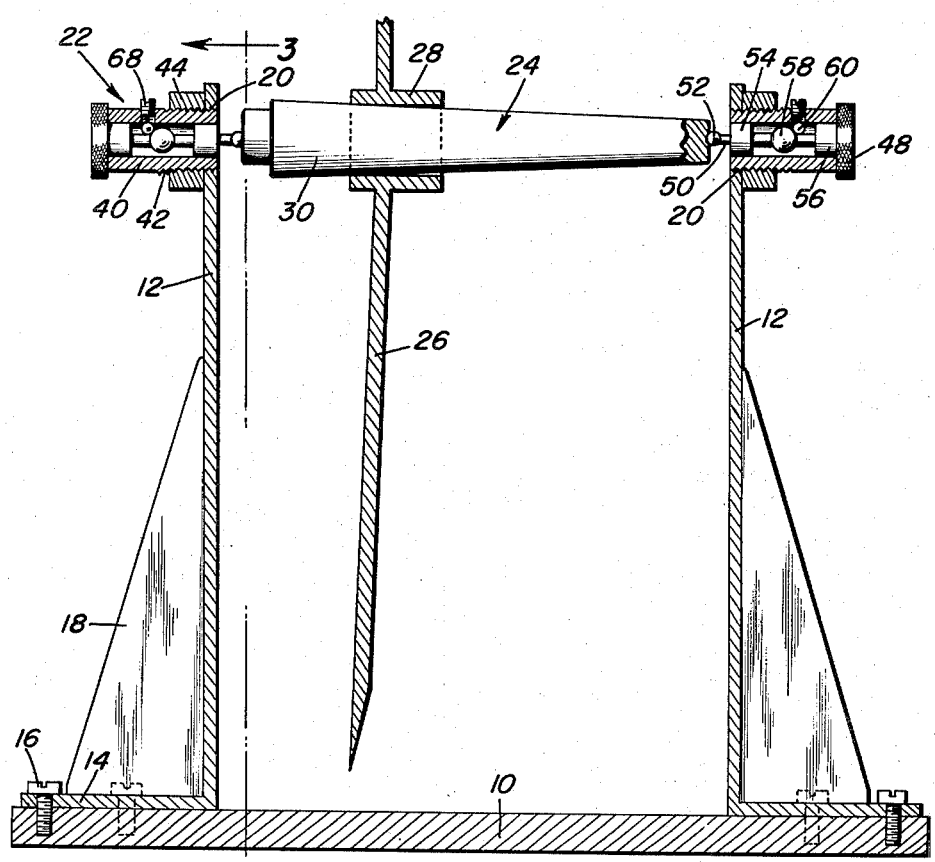
William H. Hagedorn
INVENTOR.

Nov. 19, 1957   W. H. HAGEDORN   2,813,428
ROTARY LAWN MOWER BLADE BALANCER
Filed Feb. 6, 1956   2 Sheets-Sheet 2

William H. Hagedorn
INVENTOR.

BY

United States Patent Office 2,813,428
Patented Nov. 19, 1957

2,813,428

ROTARY LAWN MOWER BLADE BALANCER

William H. Hagedorn, Erlanger, Ky.

Application February 6, 1956, Serial No. 563,629

4 Claims. (Cl. 73—480)

This invention comprises novel and useful improvements in a rotary lawn mower blade balancer and more particularly relates to an apparatus to facilitate the detecting of out of balance in the blades of rotary lawn mowers and to facilitate the remedying of this defect.

The primary purpose of this invention is to provide an apparatus which will greatly facilitate the detection of an out of balance condition in the blades of rotary lawn mowers, and also will facilitate subsequent treatment of the blades to remedy this defect.

A further object of the invention is to provide an apparatus in accordance with the preceding object which will readily accommodate a plurality of lawn mower blades having different sized hubs thereon.

A still further object of the invention is to provide a device in conformity with the above mentioned objects wherein a mandrel adapted to receive the hub of a rotary lawn mower blade may be journaled in an improved manner, whereby the mandrel may be very easily mounted in the device or removed therefrom.

Yet another object of the invention is to provide an apparatus in accordance with the immediately preceding object wherein the mounting of the mandrel may be effected without danger of applying an excessive holding or frictional force thereto, and whereby the mounting may be effected by a simple quick acting movement of a bearing member forming a part of the same.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the device in accordance with this invention;

Figure 2 is a vertical central sectional view, upon an enlarged scale, of a device in accordance with Figure 1, a portion of a rotary lawn mower blade being shown thereon for balancing of the same;

In power operated lawn mowers of the rotary blade type, it is particularly important that the rotary blade shall be in perfect balance. Any deviation from such balance results in unbalanced thrust upon the bearings which journal the shaft of the mower blade, and since the mounting of the shaft and blade is necessarily of the cantilever type, it is obvious that any unbalance produces excessive side thrust and wear of the bearings and lubricant seal for the lawnmower blade shaft. The purpose of the present invention is to provide a device of a simple construction which will facilitate the determination of an out of balance condition, and facilitate remedying of the same.

Figure 3:
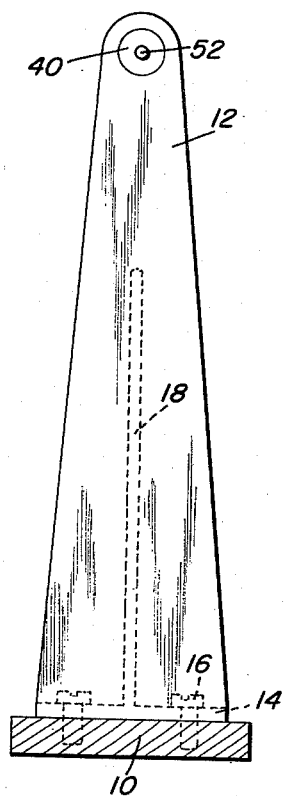
Figure 3 is a vertical transverse sectional view taken substantially upon the plane indicated by the section line 3—3 of Figure 1.

In accordance with the present invention, the device includes a flat plate-like base 10 of any suitable construction and upon which a pair of vertically extending spaced standards 12 are secured. Each standard preferably comprises a flat vertical plate-like member having a horizontally extending flange 14 at its lower end adapted to rest upon the base 10 and to be detachably secured thereto as by adjusting screws 16. Reinforcing ribs 18 are provided integrally joining medial portions of the flange 14 and the vertical members of the standards, as will be apparent from the showing of Figure 2 and the dotted line showing of Figure 3.

At their upper ends, the standards are provided with internally threaded bores 20 for the reception of support means designated generally by the numeral 22, by means of which an arbor 24 is rotatably journaled for rotation about a horizontal axis.

Shown in Figure 1 is a portion of a rotary lawn mower blade 26 of a conventional character, the same being provided with a hollow hub portion 28 by means of which the blade is adapted to be attached to the power shaft of the lawn mower.

Figure 6:
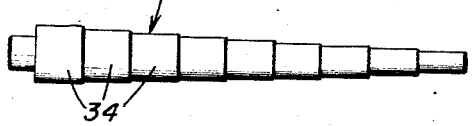
Figures 6 and 7 are elevational views of two modified constructions of arbors which may be employed in accordance with this invention.
Figure 7:
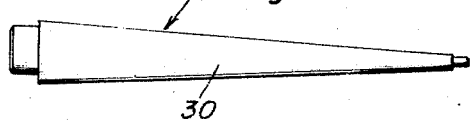

While various types of supporting mandrels may be employed, the two modified constructions of Figures 6 and 7 are especially satisfactory since each will permit the same device to readily accommodate a plurality of different sizes of hubs of lawn mower blades. In the preferred form of mandrel shown in Figure 7, and which has been illustrated in Figures 1 and 2 of the drawings, the mandrel comprises a tapered, frusto-conical body portion 30 which at its opposite extremity is provided with axial recesses 32 adapted to receive bearing members forming a part of the support means 22, whereby the mandrel is mounted for rotation.

In the modified form of Figure 6, the mandrel 24 is provided with a plurality of longitudinally adjacent portions 34 which are of progressive varying diameter. Alternatively, each of these portions 34 may likewise be provided with a slight taper if desired.

In either of the forms of mandrel, the hub 28 of a blade 26 may be placed thereon and moved to a position where the hub will snugly engage the corresponding portion of the mandrel whereby the hub will be caused to rotate with the mandrel in fixed position relative thereto. Thus, either form of mandrel will accommodate different sizes of hubs of mower blades.

Figure 4:
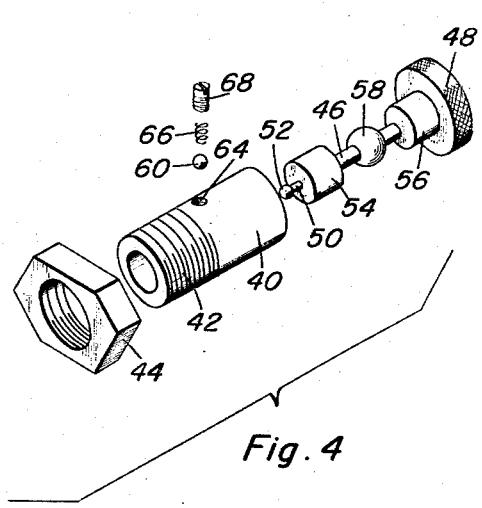
Figure 4 is a group perspective view of the various elements forming one of the support members journalling one end of the balancing arbor of the device.
Figure 5:
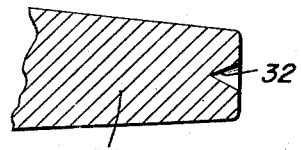
Figure 5 is a detail view taken upon an enlarged scale upon a radial plane at one end of one form of arbor.

Regardless of the form of mandrel, it is preferred to provide the support means 22 which is shown more clearly in Figures 2 and 4. This support means consists of a bushing 40 having an externally threaded portion 42 adapted to be threadedly engaged in the internal threaded apertures 20 of the standards 12, and to be retained in adjustable threaded engagement therewith as by a lock nut 44. A bearing member is slidably and rotatably received in the bushing, the bearing member including a rod 46 having at one end an enlarged knurled finger grip portion 48, and at its other end having a diametrically reduced extremity 50 extending in a terminal portion 52. The latter as illustrated is of spherical construction and is adapted to be received in the recess 22, although it will be understood that the member 52 and the recess 32 may be of any desired shape. The rod 46 is provided with spaced, enlarged cylindrical bearing portions 54 and 56 which are slidably received within the bore of the bushing 40 and serve to journal the rod therein. Intermediate its ends, that is between the bearing members 54 and 56, the rod 46 is provided with an enlargement 58 which constitutes an abutment member. Preferably this enlargement is of spherical contour, although it will be understood other shapes may be provided as desired.

Cooperating with the abutment member 58 of the bearing member is a resilient locking means or retainer. Conveniently, the latter consists of a detent in the form of a ball 60 which is disposed in a bore 62 intermediate the ends of the bushing 40, and which is urged as by a spring 66, whose force or pressure is adjusted as by a screw 68 received in the threaded bore 64. The arrangement is such that the spring urges the detent inwardly and into engagement with the abutment member 58, to provide a snap action resilient retainer for the same. Thus, with the parts in the position shown in Figure 1, the bearing member is disposed inwardly of the bushing or towards and into engagement with the mandrel 24 for journaling the same. In order to quickly disengage the mandrel from the support it is merely necessary to grasp the finger grip portion 48 of the bearing member and move this latter axially outwardly of the bushing. Either or both of the bearing members may be manipulated in this manner, and when so manipulated the abutment surface will slide under the resiliently urged detent member until the abutment member is on the outside of the same, whereby the resilient detent member will yieldingly maintain the bearing members out of operative contact with their respective end of the mandrel.

It will thus be seen that by this arrangement the bearing members may be quickly moved into engagement with the end of the mandrel for supporting the same or may be quickly disengaged therefrom, thereby facilitating the mounting of the mandrel and the rotary mower blade carried thereby between the standards, or its removal therefrom.

It will also be apparent that by adjustment of either or both bushings 40 in the screw threaded bore 20 of the standards, and the use of the lock nut 44, that a further adjustment of the support members relative to the mandrel is possible.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A balancer for rotary lawn mover blades comprising a base having spaced standards thereon, a mandrel varying in diameter between its ends for receiving and supporting thereon the hubs of rotary lawn mower blades, support means carried by said standards for engaging recesses in the opposite ends of the mandrel for journaling the latter for rotation with a rotary lawn mower blade thereon about a horizontal axis whereby to determine balance of the blade, said support means including a bushing carried by one standard, a bearing member slidable in said bushing towards and from said mandrel, said bearing member having a portion engageable in the recess in said mandrel, means associated with said bushing and bearing member releasably maintaining the latter selectively in positions relatively adjacent or remote from the mandrel, said last means including a resilient detent mounted upon and disposed in said bushing.

2. A balancer for rotary lawn mower blades comprising a base having spaced standards thereon, a mandrel varying in diameter between its ends for receiving and supporting thereon the hubs of rotary lawn mower blades, support means carried by said standards for engaging recesses in the opposite ends of the mandrel for journaling the latter for rotation with a rotary lawn mower blade thereon about a horizontal axis whereby to determine balance of the blade, said support means including a bushing carried by one standard, a bearing member slidable in said bushing towards and from said mandrel, said bearing member having a portion engageable in a recess in said mandrel, means associated with said bushing and bearing member releasably maintaining the latter selectively in positions relatively adjacent or remote from the mandrel, said last means including a resilient detent mounted upon and disposed in said bushing, said bearing member having an abutment engageable by said detent.

3. A balancer for rotary lawn mower blades comprising a base having spaced standards thereon, a mandrel varying in diameter between its ends for receiving and supporting thereon the hubs of rotary lawn mower blades, support means carried by said standards for engaging recesses in the opposite ends of the mandrel for journaling the latter for rotation with a rotary lawn mower blade thereon about a horizontal axis whereby to determine balance of the blade, said support means including a bushing carried by one standard, a bearing member slidable in said bushing towards and from said mandrel, said bearing member having a portion engageable in a recess in said mandrel, means associated with said bushing and bearing member releasably maintaining the latter selectively in positions relatively adjacent or remote from the mandrel, said last means including a resilient detent mounted upon and disposed in said bushing, said bearing member having an abutment engageable by said detent and comprising a sphere.

4. A balancer for rotary lawn mower blades comprising a base having spaced standards thereon, a mandrel varying in diameter between its ends for receiving and supporting thereon the hubs of rotary lawn mower blades, support means carried by said standards and projecting inwardly between said standards for engaging recesses in the opposite ends of the mandrel for journaling the latter between said standards for rotation with a rotary lawn mower blade thereon about a horizontal axis whereby to determine balance of the blade, said support means including a bushing carried by one standard, a bearing member slidable in said bushing towards and from said mandrel, said bearing member having a portion engageable in a recess in said mandrel, means associated with said bushing and bearing member releasably maintaining the latter selectively in positions relatively adjacent or remote from the mandrel, means for adjusting said bushing relative to said mandrel.

References Cited in the file of this patent
UNITED STATES PATENTS

| | | |
|---|---|---|
| 412,360 | Barclay | Oct. 8, 1889 |
| 984,354 | Cunningham | Feb. 14, 1911 |
| 2,185,843 | Fraser | Jan. 2, 1940 |
| 2,270,657 | Kraft | Jan. 20, 1942 |
| 2,429,139 | Scardaccioni | Oct. 14, 1947 |
| 2,752,788 | Penta | July 31, 1956 |